April 3, 1956  S. P. FREEDMAN ET AL  2,740,363
MACHINE FOR AUTOMATICALLY MAKING ROLLED CONES
Filed May 19, 1953  3 Sheets-Sheet 1

INVENTORS
Stanley Freedman
Albert A. Heyman.
BY Albert J. Kramer
ATTORNEY

INVENTORS
Stanley Freedman
Albert A. Heyman.
BY Albert J. Kramer
ATTORNEY

April 3, 1956     S. P. FREEDMAN ET AL     2,740,363
MACHINE FOR AUTOMATICALLY MAKING ROLLED CONES
Filed May 19, 1953     3 Sheets-Sheet 3

INVENTORS
Stanley Freedman
Albert A. Heyman.

BY Albert J. Kramer
ATTORNEY

United States Patent Office 2,740,363
Patented Apr. 3, 1956

2,740,363

MACHINE FOR AUTOMATICALLY MAKING ROLLED CONES

Stanley P. Freedman and Albert A. Heyman, Baltimore, Md.

Application May 19, 1953, Serial No. 355,992

7 Claims. (Cl. 107—4)

This invention relates to cone making machines and is more particularly concerned with machines for manufacturing cones, commonly referred to as rolled or sugar cones and used as edible containers or receptacles for various confections, such as ice cream, frozen custard, sherbets, etc.

The so-called roller or sugar cone is a well known type of edible confectionery container in the form of a conically rolled sheet. It is customarily formed by baking batter having a high sugar content in the form of a flat wafer and then rolling it into a conical shape while hot and pliable, thereafter permitting it to cool and set.

Certain types of automatic machines for manufacturing such cones comprise a chain of waffle irons for baking the wafers and a revolving turret of cone forming units adjacent the waffle irons with means for transferring baked wafers from the waffle irons to the cone forming units. Each cone forming unit has a slot through which the wafer passes from the waffle irons. In prior types of such machines, the automatic transfer is effected by means of a blade adjacent the slot which is set to come in scraping engagement with the face of the upper grids of the waffle irons and hence to scrape off the wafers therefrom and pass them into the cone rolling device. An arrangement of this type is described in application for patent Ser. No. 261,274, filed December 12, 1951.

We have found that this arrangement presents a number of practical difficulties which become quite formidable in large scale operations.

One of the major difficulties resides in the fact that the scraping engagement results in a wearing between the blade and the waffle grids, requiring constant readjustment and frequent replacement of the blades. Also, small particles of steel, due to the attrition, fall off and become incorporated into the product. At the instant of transfer, the wafer is hot and sticky and the metal particles readily adhere to it. The scraping engagement sometimes results in the breaking off of particles from the waffle grid of substantial size, requiring replacement of the damaged grid. Such particles may jam or break parts of the machinery. Moreover, they are injurious to health as foreign matter in a food product.

The scraping engagement has another undesirable effect upon the machine. The waffle irons each comprise a base grid and a cover grid hinged to the base grid. In the baking position, the cover grid is against the base grid with the wafer being baked between them. After the wafer is baked, the cover grid is opened to an upright position. The wafer clings to the cover grid by virtue of different groove designs, and it is against the face of the cover grid that the blade executes its scraping engagement. When a wafer is baked between the grids of the waffle iron, carbon deposits on their surfaces during the baking and it is this carbon which prevents the wafer from sticking to the grid surfaces and being torn to pieces when the wafer is removed. When the blade of a cone rolling unit comes in scraping engagement with the cover grids of the waffle iron, carbon is scraped off.

This results in different degrees of carbon deposits on the two grids with consequent variations in lubricating effects. Frequently, this results in the wafer sticking to the cover grid during an attempt to transfer it into the cone rolling unit with consequent losses in cones manufactured and stoppages necessary to clean the machine.

While grid sticking may sometimes be prevented by increasing the shortening content of the batter, it is not always possible to do so. The shortening content is a function of other and more important factors. For example, the time of setting of the formed cones is important so that they can be removed from the machine quickly in a rigid condition. Shortening content and humidity of the ambient air affects the setting period which means that the shortening, for optimum operations, must be varied in accordance with the humidity. Consequently, it is not possible, generally, to adjust the shortening content of the batter to optimum conditions of the upper and lower grids when they have different degrees of carbon deposits.

The overall objective of the present invention is the provision of means for automatically transferring the wafers from the waffle irons to the cone rolling unit without a scraping engagement between any part of the waffle iron and the rolling unit, thereby obviating the deficiencies pointed out above.

In carrying out the overall objectives of the present invention, it is necessary to provide high precision operation in a device which is normally relatively crude. Accordingly, another object of the invention is the provision of means which make it possible to develop the high precision necessary in such a device.

Another object of the invention is the provision of an automatic cone rolling machine of the type mentioned having a chain of double grid waffle irons for baking the wafers to be rolled into cones, a plurality of rolling units arranged on a rotating turret, each unit having a slot for the passage of baked wafers from the baking unit, a blade for guiding the wafer into the slot and positive means for holding the blade out of scraping engagement with the grids, but in minutely spaced relation thereto to contact the wafers and guide them into the slot.

These and other objects and advantages will be more fully apparent from the following description, considered together with the accompanying drawings, which illustrates an embodiment of the invention.

Figure 1:
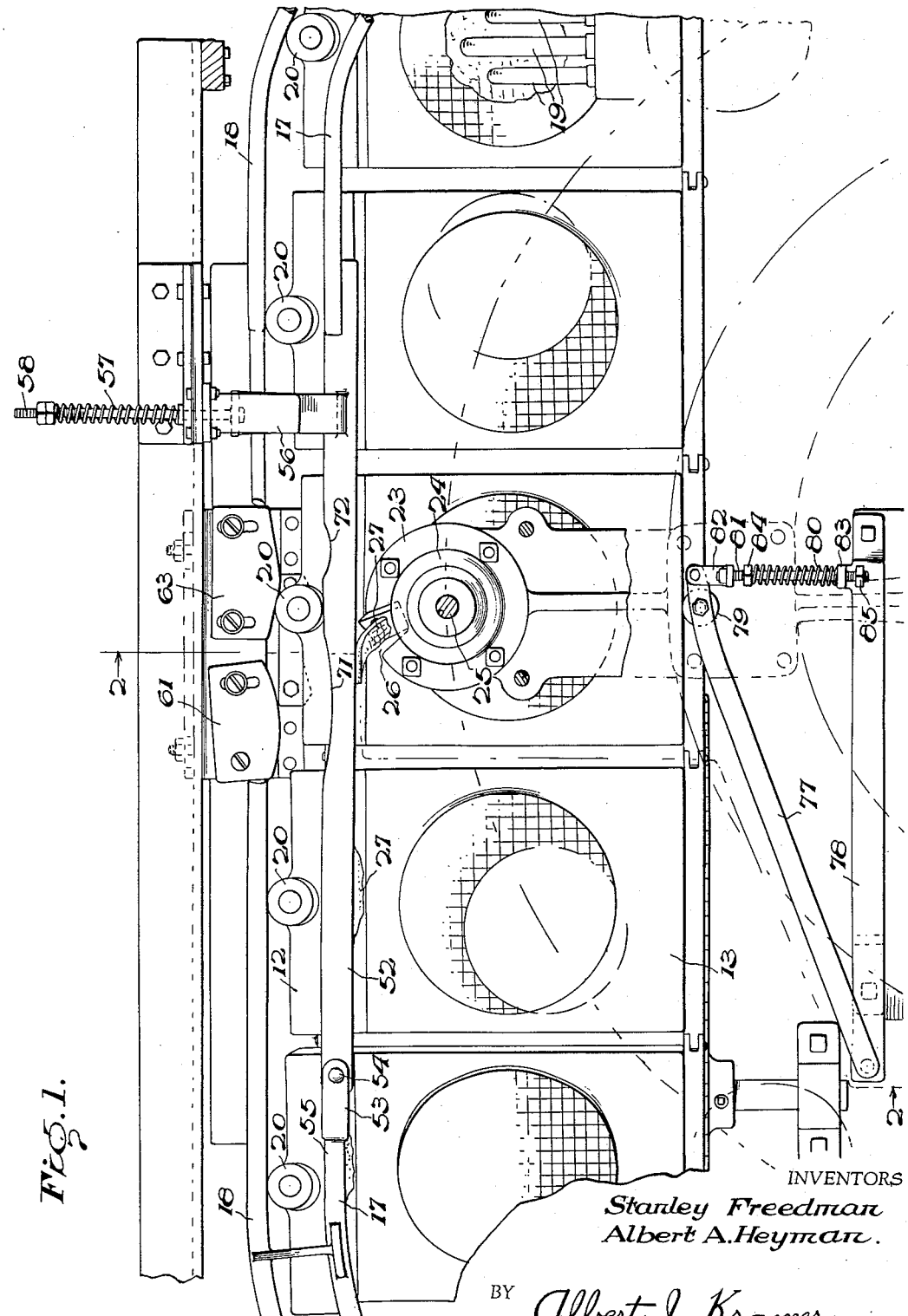
Fig. 1 is a top plan view of a portion of the machine, partly broken away, showing the transfer station and appurtenant parts.
Figure 2:
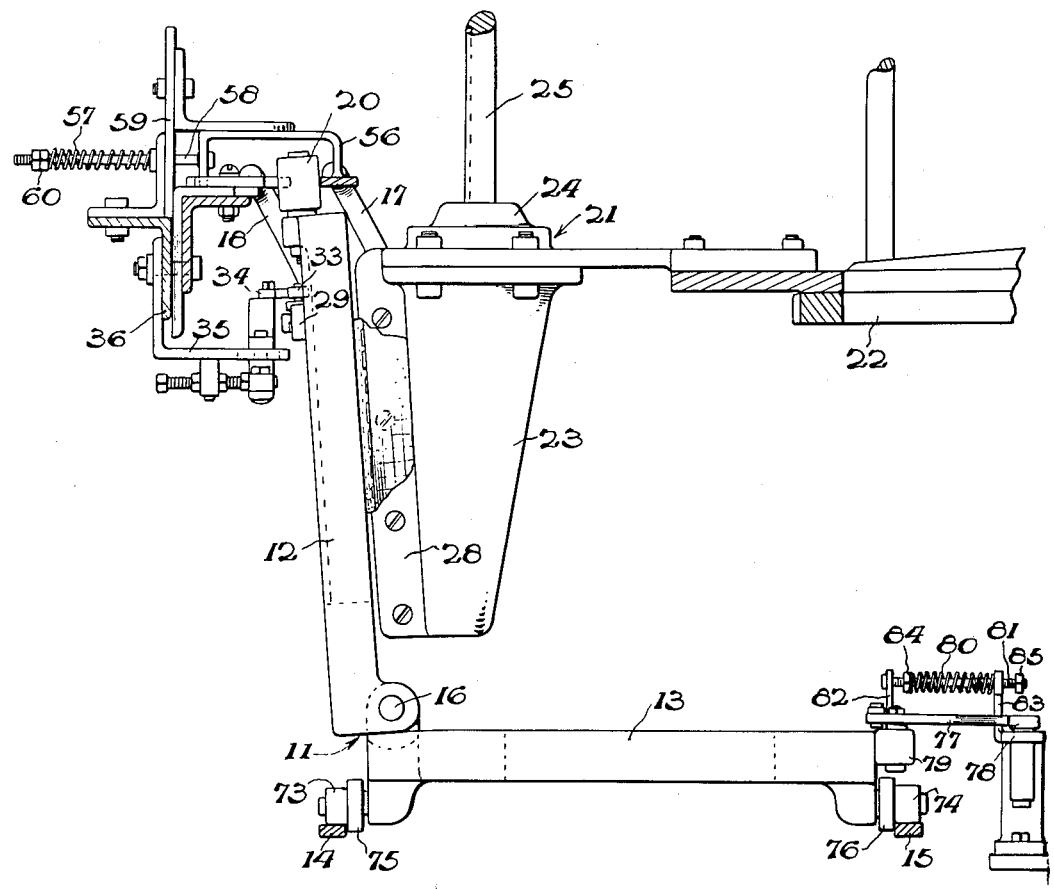
Fig. 2 is a section along the line 2—2 of Fig. 1.
Figure 3:
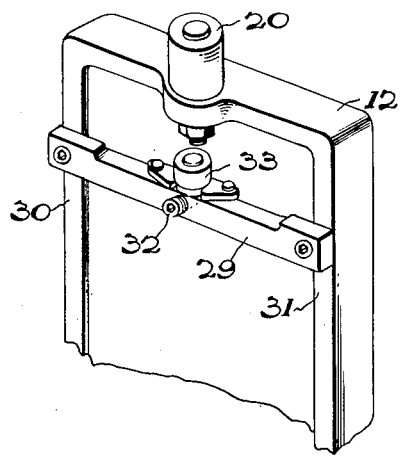
Fig. 3 is a perspective view of the upper back portion of one of the top waffle grids, showing the cam roller and adjusting means.
Figure 4:
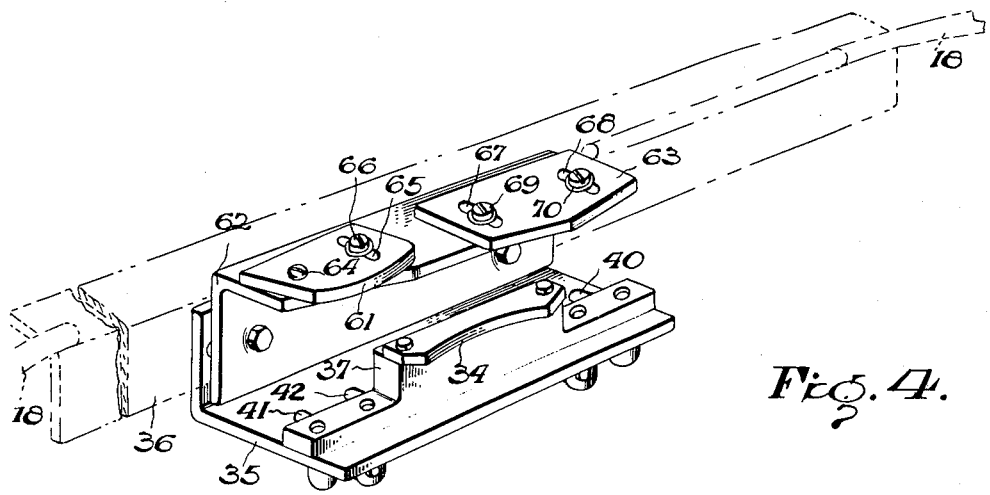
Fig. 4 is a perspective view of the lateral cam unit attached to the frame of the machine adjacent the transfer station.
Figure 5:
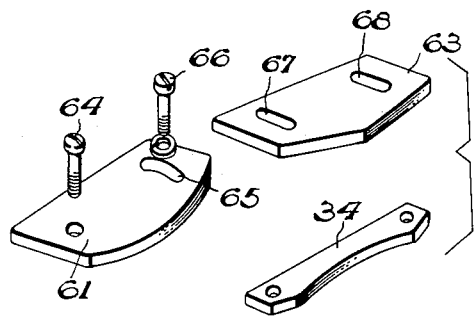
Fig. 5 is a perspective view of the cam members of Fig. 4, apart from the other elements thereof.
Figure 6:
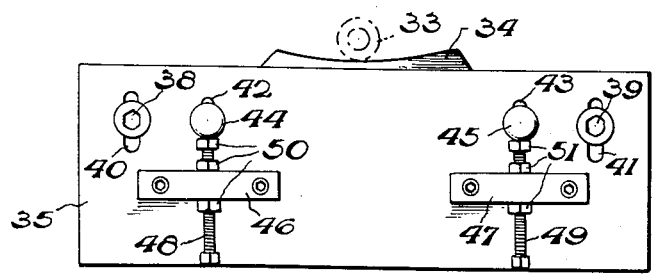
Fig. 6 is a bottom plan view of the unit shown in Fig. 4.

Referring with more particularity to the drawings in which like numerals designate like parts, the embodiment illustrated comprises a chain of waffle irons 11, each having a cover grid 12 and a base grid 13. The base grids are linked together in an endless chain and travel in a circuit on parallel tracks 14 and 15, the circuit including a baking oven (not shown). The cover grid is hinged to the base grid by hinge pins 16 and is moved between the open and closed positions thereon by means of a camway formed by the parallel tracks 17 and 18. Batter to be baked in the form of a wafer is deposited on the base grids at a point beyond the transfer station by nozzles 19 after which the cover grids are moved downwardly on the batter by rollers 20 thereon operating between the camway tracks 17 and 18. The waffle irons then move into the baking oven. Emerging from the baking oven, the cover grids are opened to the upright position, the baked wafers being carried by the cover grids.

The rolling units 21 are mounted at the periphery of a rotating turret 22 and each unit includes an inverted conical mold 23 and a cooperating rotating core 24. The core is mounted on the bottom of a rotatable shaft 25 which also reciprocates vertically on the turret, by means not shown. The rotation of the turret is synchronized with the travel of the chain of waffle irons by suitable gearing means, not shown herein, but which is fully illustrated and described in said application for patent, Ser. No. 261,274, and to which reference is here made for a full and complete description of the device as a whole.

The mold of each rolling unit is provided with a slot 26 for the passage of the baked wafer 27 therein and adjacent the slot is a guide plate 28 which is adapted to contact the leading edge of the baked wafer on the cover grid and direct it into the slot. For the purpose of this invention, however, it is essential that the outer edge of the guide plate be maintained in minutely spaced relation to the face of the cover grid at the time of transfer of the wafer from the grid to the rolling unit. The spacing must be less than the thickness of the wafer and should, generally, be about ½ the thickness, preferably less. Moreover, this spacing must be maintained for a sufficient interval to permit the leading edge of the wafer to enter the rolling unit and be caught by the rotating core, after which the wafer is drawn in by the core.

The minute spacing is established and maintained by means acting against the cover grids during the period of transference. The back of each cover grid is provided with a stiff bar 29 having a small degree of resilience. The outer ends of the bar are secured to projecting marginal edges 30 and 31 of the back, thereby bridging the space therebetween. A bolt 32 passes through the center of the bar and abuts the back of the grid. By turning the bolt 32, the bar may be bowed slightly as an adjustment. On top of the bar there is mounted a roller 33 which is adapted to engage a concave cam 34 on a bracket 35 located at the wafer transfer station and attached to a stationary frame member 36 of the machine. The curvature of the face of the cam 34 is generally of an elliptical segment and it assures parallelism and absence of scraping between the guide portion of the cone mold and the wafer-carrying grid during relative rotation thereof, because of the controlled, predetermined transverse movement imparted to the wafer-carrying grid thereby under the force of a bar 52, hereinafter more fully described, said force being independent of the said guide portion. The need for this is indicated by the fact that any given lateral edge of a revolving or rotating cone will be presented parallel to a given exterior line only once in each revolution of the lateral edge. At all other times, a non-parallel relation obtains. Such a lateral edge corresponds to the guide lip of the conical mold and the exterior line corresponds to the leading edge of the wafer. In order for the machine to work properly, it is necessary to maintain a substantially parallel relation between these two members for a sufficient interval of travel to permit transfer of the wafer into the mold. The cam 34 is bolted or otherwise secured to a longitudinal bar 37 which, in turn, is adjustably secured to the bracket by means of bolts 38 and 39 passing through transverse slots 40 and 41 of the bracket. These bolts may be loosened to permit a transverse adjustment and then retightened to maintain the adjusted position. In order to provide for precise adjustments, an additional pair of slots 42 and 43 are provided in the bracket parallel to the slots 40 and 41 through which arms 44 and 45 project from the bottom of the bar 37. Lugs 46 and 47 are attached to the bottom of the bracket and lead screws 48 and 49 are connected to the arms 44 and 45 and the lugs 46 and 47, respectively, substantially as shown. The lead screws are also provided with lock nuts 50 and 51 to hold the screws in adjusted position. By loosening the bolts 38 and 39 and nuts 50 and 51, the lead screws may be turned to adjust the transverse position of the bar 37 and its attached cam 34, after which these bolts and nuts are retightened.

The cam 34 is an abutment for the rollers 33 during the period of transference of the wafers and its curvature is such as to maintain the desired spaced relation between the guide plate 28 and the face of the cover grid, as explained above.

In order to maintain positive contact of the rollers 33 with the cam during the period of transference, a portion of the camway track 17 running along the transfer station is pivoted at one end and resiliently urged toward the cam. The portion referred to is a bar 52, one end thereof being pivoted to a boss 53 by a vertical pin 54, the boss being attached to or integral with the fixed end 55 of the said track 17. The other end of the bar 52 is connected to a transverse arm 56 which is spring biased by means of a coil spring 57. A bolt 58 is connected at one end to the arm 56, the other end slidably projecting through a stationary member 59. The spring 57 is mounted in compression between the member 59 and adjusting nuts 60 on the other end of the bolt. By these means the bar 52 acts against the rollers 20 on top of the cover grids and constantly urges the grids outwardly when in contact therewith.

In order to bring the rollers 33 in proper relation for engagement with the cam 34, a convex cam 61 is disposed on a bracket 62 above the bracket 35 in a position to engage the rollers 20 just as the rollers 33 approach the cam 34 to move the plate inwardly far enough for this purpose. The cam 61 is set so that as soon as contact is made between the roller 33 and the cam 34, it no longer acts against the roller, thereby permitting the bar 52 to take up its function of forcing and keeping the roller 33 against the cam 34.

A second convex cam 63 is placed at the other end of the cam 34 to guide the roller 20 to the proper position for entering between the tracks 17 and 18 before continuing its course of travel.

The guide cam 61 is made adjustable by pivoting it at one end with a pin 64 to the bracket 62, the other end having an arcuate slot 65 which engages a holding bolt 66 on the bracket 62. The other cam 63 is also made adjustable by means of a pair of slots 67 and 68 engaging holding bolts 69 and 70 on the bracket 62.

The bar 52 is provided with concave curvatures 71 and 72 opposite the cams 61 and 63 to parallel the line of travel of the rollers 20 and prevent abruptness in the action of the bar against the roller 20 and also to permit the bar to contact the immediately succeeding roller 20 as it enters engagement with the first convex cam 61 when a forward roller is leaving the second convex cam 63. This results in a smooth operation without jarring the cover grids and thereby obviates the danger of the wafer being shaken loose from the grid before it reaches the guide member 28.

The lower grids 13 of the waffle irons are provided with wheels 73 and 74 which ride on the tracks 14 and 15. The wheels have inner flanges 75 and 76, respectively. The normal looseness between these wheel flanges and the tracks 14 and 15 introduces lateral play at the bottom of the lower grids 12. To prevent this play from affecting the proper minutely spaced relation between the cover grid and the guide member 28, it is taken up by means of a thrust unit comprising a diagonal arm 77 pivoted at one end to a frame member 78 of the machine, the other or free end carrying a roller 79 which is placed against the inner side of the base grid 13, opposite the transfer station. The roller 79 is urged against the side of the grid by means of a coil spring 80 between the free end of the arm 77 and the frame member 78. The spring 80 is mounted on a threaded bolt 81, one end of which is connected to a bracket 82 on the arm. The other end of the bolt slidably engages a lug 83 on the frame member 78. The spring is placed in compression between the lug 83 and an adjusting nut 84 on the bolt. The adjusting nut is for changing the tension on the spring as may be necessary for optimum operation. Another nut 85 at the outer end of the bolt on the opposite side of the lug is for limiting displacement of the roller as it leaves one grid to engage a succeeding one.

Having thus described our invention, we claim:

1. In a cone rolling machine, the combination comprising a rotary member, a cone mold revolvably carried thereby, wafer rolling means associated with the mold, said mold having a feed slot along its wall, and having a portion adjacent the slot presented as a wafer guide, conveyor tracks, baking grids conveyed thereon along a path substantially tangential to the path of revolution of said guide portion and in a direction opposite thereto, whereby said grids are presented in position adjacent the guide portion for transference of wafers from the grids to the mold, a stationary abutment cam for said grids, and a pressure bar biasing the grids against said cam, said cam having a concave curvature opposite said pressure bar to cause movement of the grids transversely of the conveyor tracks while the grids are being conveyed therealong to bring and maintain the relative position of the grids and adjacent guide portion in minutely spaced relation, whereby the leading edges of the wafers on the grids are contacted by and led into the cone mold through the feed slot by the guide portion for rolling by the wafer rolling means without the guide portion executing a scraping engagement against the grids.

2. In a cone rolling machine, the combination comprising a rotary member, cone molds revolvably carried thereby, wafer rolling means associated with the mold, said molds having each a feed slot along its wall and having a portion adjacent the slot presented as a wafer guide, conveyor tracks, baking grids conveyed thereon along a path substantially tangential to the path of revolution of said guide portion and in a direction opposite thereto, said grids having a wafer carrying member hinged to a base member, said wafer-carrying member being hingedly movable to a position substantially parallel to the guide portion, means comprising a stationary abutment cam of concave curvature on one side and a pressure bar opposite said cam on the other side of said wafer-carrying member for moving said wafer-carrying member into said parallel position and in minutely spaced relation to the guide portion for a given interval of travel of the guide portion along the face of the wafer-carrying member to permit the guide portion to contact the leading edge of the wafer, without coming in scraping engagement with the face of the wafer-carrying member, and convey it through the slot into the cone mold for rolling by the wafer-rolling means.

3. The subject matter as defined by claim 2 in which the wafer-carrying member is provided with two rollers, one roller for contact by the stationary abutment cam and the other for contact by the pressure bar.

4. A cone rolling machine as defined by claim 3, and a stationary cam guide in contact with the last mentioned roller on the side thereof opposite the pressure bar, for guiding the first mentioned roller in and out of contact with the abutment cam.

5. In a cone rolling machine of the character described, a wafer-carrying grid, a revolvable wafer-rolling member in wafer transfer relation therewith, a roller carried by the grid, a stationary abutment cam for said roller, resilient means urging the grid toward said cam for contact of the roller against the cam, and a thrust member comprising a second roller carried by the grid, said resilient means including an arm slidably engaging said second roller, said arm being pivoted at one end to a stationary member, and a spring for urging said arm against said second roller.

6. In a cone rolling machine of the character described, a wafer-carrying grid, a revolvable wafer-rolling member in wafer transfer relation thereto, an upper roller carried by the grid, a bottom grid connected to the wafer-carrying grid, a flanged wheel mounted on the bottom grid, a track engaging said flanged wheel, a stationary abutment cam for said roller, a second roller carried by the wafer-carrying grid, an arm slidably engaging said second roller, said arm being pivoted at one end to a stationary member, a spring for urging said arm against said second roller, and a push arm urging the flange of the wheel against the track.

7. In a cone rolling machine of the character described, a wafer-carrying grid, a revolvable wafer rolling member in wafer transfer relation therewith, a roller carried by the grid, a stationary abutment cam for said roller, resilient means urging the grid toward said cam for contact of the roller against the cam, a bottom grid connected to the wafer-carrying grid, a flanged wheel mounted on the bottom grid, a track engaging said flanged wheel, and means urging the flange of the wheel against the track.

References Cited in the file of this patent

UNITED STATES PATENTS

| | | |
|---|---|---|
| 2,321,634 | Tatosian | June 15, 1943 |
| 2,628,576 | Finke | Feb. 17, 1953 |